(12) United States Patent
Keller

(10) Patent No.: US 7,419,632 B2
(45) Date of Patent: Sep. 2, 2008

(54) METHOD AND DEVICE FOR THE PRODUCTION OF A THREE-DIMENSIONAL OBJECT BY MEANS OF SINTERING

(75) Inventor: Peter Keller, Krailling (DE)

(73) Assignee: EOS GmbH Electro Optical Systems, Krailling (DE)

( * ) Notice: Subject to any disclaimer, the term of this patent is extended or adjusted under 35 U.S.C. 154(b) by 251 days.

(21) Appl. No.: 10/637,866

(22) Filed: Aug. 8, 2003

(65) Prior Publication Data

US 2004/0104499 A1 Jun. 3, 2004

(30) Foreign Application Priority Data

Aug. 9, 2002 (DE) ................ 102 36 697

(51) Int. Cl.
*B29C 35/08* (2006.01)
*B29C 41/02* (2006.01)
*B29C 41/52* (2006.01)

(52) U.S. Cl. .............. 264/497; 264/40.6; 264/113; 264/408; 264/410

(58) Field of Classification Search .......... 264/40.6, 264/113, 408, 410, 482, 497
See application file for complete search history.

(56) References Cited

U.S. PATENT DOCUMENTS 5,284,695 A * 2/1994 Barlow et al. ............. 264/497
5,352,405 A * 10/1994 Beaman et al. ........ 264/497 X
5,427,733 A * 6/1995 Benda et al. ........... 264/497 X
5,908,569 A 6/1999 Wilkening et al.
6,153,142 A 11/2000 Chari et al. .............. 264/401
6,822,194 B2 * 11/2004 Low et al. ............. 219/121.83

FOREIGN PATENT DOCUMENTS

| EP | 0 388 095 | 9/1990 |
|---|---|---|
| EP | 0 764 079 B1 | 3/1997 |
| WO | WO 96/29192 | 9/1996 |
| WO | WO 96/35573 | 11/1996 |

\* cited by examiner

*Primary Examiner*—Leo B Tentoni
(74) *Attorney, Agent, or Firm*—George W. Neuner; Edwards Angell Palmer & Dodge LLP

(57) ABSTRACT

A process and a device for producing a three-dimensional object is provided, with which process or device the object is produced by layer-wise solidification of a pulverulent material by sintering of the material at the points corresponding to the cross-section of the object by means of the action of radiation energy. The process comprises the application of a layer of the pulverulent material onto a substrate or a previously sintered layer, pre-heating of the pulverulent material to a working temperature below the temperature at which the powder is sintered and sintering of the material at the points corresponding to the cross-section of the object in the layer, wherein a step of controlled heating of an applied powder layer and of determining the quantity of heat taken up by the powder per (FIG. 3) temperature interval for at least two temperature intervals is carried out.

12 Claims, 4 Drawing Sheets

METHOD AND DEVICE FOR THE PRODUCTION OF A THREE-DIMENSIONAL OBJECT BY MEANS OF SINTERING

BACKGROUND OF THE INVENTION

The invention relates to a process and device for producing a three-dimensional object by means of sintering by layer-wise solidification of a pulverulent material by sintering of the material at points corresponding to the cross-section of the object by means of the action of radiation energy.

Such a process or such a device are known from European application 0 764 079. The laser-sintering device described there has radiant heaters for pre-heating the sintering powder. The heating capacity of the radiant heaters can be regulated in order to pre-heat the powder to a preset temperature.

A laser-sintering device and a laser-sintering process, in which device or in which process the surface temperature of the powder is measured in the laser focus and as a function thereof the laser power is regulated so that the temperature in the focus remains constant, is known from U.S. Pat. No. 6,153,142.

Pre-heating or pre-warming of powder newly applied to a layer up to a working temperature $T_A$, which lies slightly below the melting point for partly crystalline thermoplastics or up to slightly below the glass transition temperature for amorphous thermoplastics, is carried out to save laser energy and to facilitate a continuous building process. The working temperature $T_A$ to be selected depends not only on the type of thermoplastic and may not simply be determined from the theoretical melting or glass transition points. Rather, a series of further material and plant factors are to be taken into account. Hence, in practice charge-related differences of the melting or glass transition point may occur. Furthermore, environmental influences may affect the transition points, for example aging of the powder or influence of moisture. For example mixtures of charges of the same material having variable composition are also used, in particular mixtures of new and used powders, that is unsolidified powder from earlier building processes.

In the known laser-sintering devices and processes, the working temperature and also the required laser power is set according to empirical values for the particular powder or on the basis of tests for each building process. Adaptation to certain powder properties, such as for example adaptation to whether it is new powder, recycling powder, mixtures of powders, is only possible due to pre-tests. The use of empirical values is open to error, the undertaking of tests time and cost intensive.

SUMMARY OF THE INVENTION

It is the object of the present invention to provide a process and a device for producing a three-dimensional object by means of sintering, with which process or with which device the disadvantages described are avoided and with which device the quality of the objects formed is increased.

The present invention provides a process for producing a three-dimensional object by layer-wise solidification of a pulverulent material by sintering of the material at points corresponding to the cross-section of the object by means of the action of radiation energy having the steps of applying a layer of the pulverulent material to a substrate (2) or a previously sintered layer; pre-heating of the pulverulent material to a working temperature ($T_A$) below the temperature at which the powder is sintered; and sintering of the material at the points corresponding to the cross-section of the object in the layer; characterised by a step of controlled heating of an applied powder layer and determining the quantity of heat taken up by the powder per temperature interval for at least two temperature intervals.

The process according to the present invention also may include one or more of the following features:

a) the change (dQ/dT) of the quantity of heat taken up per temperature interval is determined as a function of the temperature;

b) a material-specific temperature ($T_{characteristic}$) of the pulverulent material, such as the melting temperature and/or the glass transition temperature and/or the onset temperature, are determined from the change of the quantity of heat taken up per temperature interval;

c) the working temperature ($T_A$), to which the powder is to be pre-heated, is adjusted as a function of the change ascertained;

d) the working temperature ($T_A$) is adjusted so that it lies below an ascertained material-specific temperature ($T_{characteristic}$) by a preset temperature interval ($\Delta T_{red}$);

e) the power of the radiation source required for sintering is determined as a function of the ascertained quantity of heat taken up per temperature interval;

f) the heating power of a heating device (8, 9) used for pre-heating is controlled and/or regulated as a function of the ascertained quantity of heat taken up per temperature interval;

g) the step of determining the quantity of heat taken up by the powder per temperature interval is carried out on an applied powder layer before the construction process;

h) the step of determining the quantity of heat taken up by the powder per temperature interval is carried out during the building process;

i) a laser is used as a radiation source; and/or j) a plastic powder, preferably a polyamide or polystyrene, is used as a powder.

The present invention also provides a device for producing a three-dimensional object by layer-wise solidification of a pulverulent material by sintering of the material at points corresponding to the cross-section of the object by means of the action of radiation energy having a material-application device (7) for applying the pulverulent material to a substrate (2) or a previously solidified layer; a heating device (8, 9) for pre-heating the applied layer to a working temperature ($T_A$) below the temperature at which the powder is sintered; and an irradiation device (5) for sintering the material at the points corresponding to the cross-section of the object in the layer; characterised by a determination device for determining the quantity of heat taken up by the powder during pre-heating per temperature interval for at least two temperature intervals.

The device according to the present invention also may include one or more of the following features:

1. a calculating device for calculating the change in quantity of heat taken up per temperature interval as a function of the temperature;

2. the calculating device is designed so that it determines a material-specific temperature ($T_{characteristic}$) of the pulverulent material, such as the glass transition temperature and/or the onset temperature and/or the melting temperature, from the change in quantity of heat taken up per temperature interval;

3. a control device (10) for the heating device (8, 9), which controls the heating device so that the working temperature ($T_A$), to which the powder is to be pre-heated, is adjusted as a function of the ascertained change;

4. the control device (10) is designed so that the working temperature is adjusted so that it is below an ascertained material-specific temperature by a preset temperature interval;
5. a control device for controlling the irradiation device (5), that the power of the radiation source required for sintering is adjusted as a function of the quantity of heat taken up ascertained per temperature interval;
6. the irradiation device is designed as a laser;
7. the heating device is designed as a radiant heater (9), in particular as an infrared emitter; and/or
8. a temperature sensor (11), preferably a pyrometer, is provided for measuring the temperature of the pulverulent material.

According to the invention, in the pre-heating phase during laser sintering, a temperature profile of the pulverulent material currently used is established such that by plotting the energy taken up by the powder per temperature interval, material-specific parameters, such as the specific thermal capacity, the position of transition temperatures, such as for example the glass transition temperature, the onset temperature, the melting temperature, are determined.

One advantage consists in that by the material-specific parameters thus ascertained the working temperature may be adjusted in optimum manner with regard to the powder used. The required laser energy for melting and partial melting of the powder may then also be selected suitably, adapted to this temperature adjustment, from the measured parameters and regulation of the heating circuits may be finely adjusted. Hence, the further advantage with respect to measurement of the powder outside the laser-sintering device becomes clear, which consists in that transition corrections between laboratory apparatus and laser-sintering device do not apply.

BRIEF DESCRIPTION OF THE DRAWINGS

Further features and advantages of the invention can be seen from the description of exemplary embodiments using the figures. Of the figures.

DETAILED DESCRIPTION OF THE INVENTION

Figure 1:
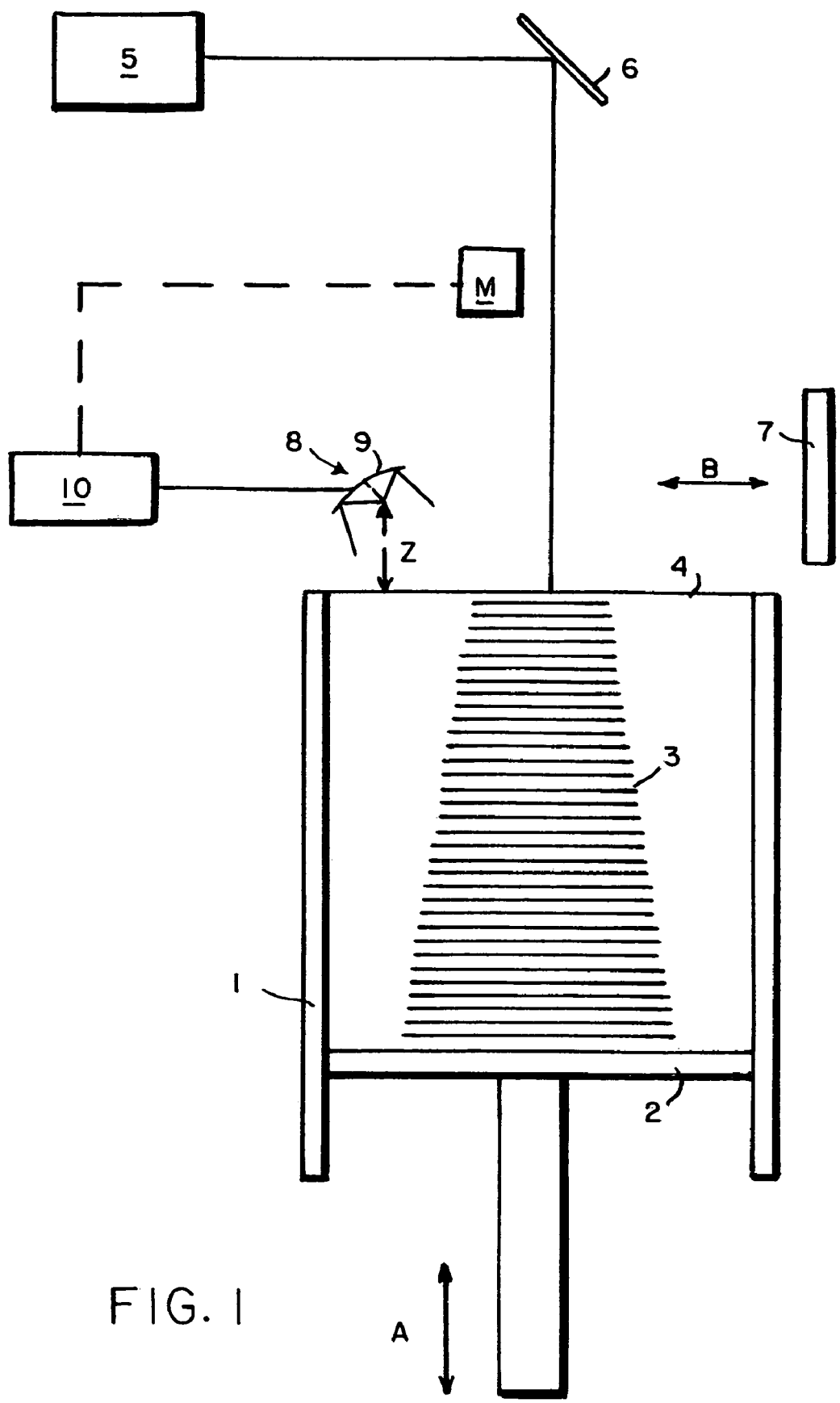
FIG. 1 shows a schematic representation of an exemplary embodiment of the device.

FIG. 1 shows a laser-sintering device as exemplary embodiment of a device of the invention. The laser-sintering device has a container 1 which is open at the top. A support 2 for supporting the object 3 to be formed is provided in the container 1. The support 2 can be moved up and down in vertical direction in the container 1 by means of a drive indicated schematically by the arrows A. The upper edge of the container 1 defines a working plane 4. An irradiation device 5 in the form of a laser, which emits a directed laser beam which is deflected via a deflecting device 6 onto the working plane 4, is arranged above the working plane 4. Furthermore, a coater 7 for applying a layer of a powder material to be solidified onto the surface of the support 2 or a layer solidified last, is provided. The coater 7 can be moved back and forth over the working plane 4 by means of a drive indicated schematically by the arrows B.

The device also has a heating device 8 arranged above the working plane 4 for pre-heating an applied but not yet sintered powder layer to a working temperature $T_A$ suitable for sintering. The heating device is designed, for example in the form of one or a plurality of radiant heaters 9, for example infrared emitters, which is or are arranged above the working plane so that the powder layer applied can be heated uniformly. The heating device is also connected to a control and/or regulating device 10 for controlling and/or regulating the heating capacity.

Furthermore, a temperature-measuring device 11, which comprises for example one or more temperature-measuring sensors, for example in the form of pyrometers and which serves for contact-free measuring of the temperature of the powder layer applied last or the uppermost powder layer, is provided at a distance above the working plane 4.

Figure 2:
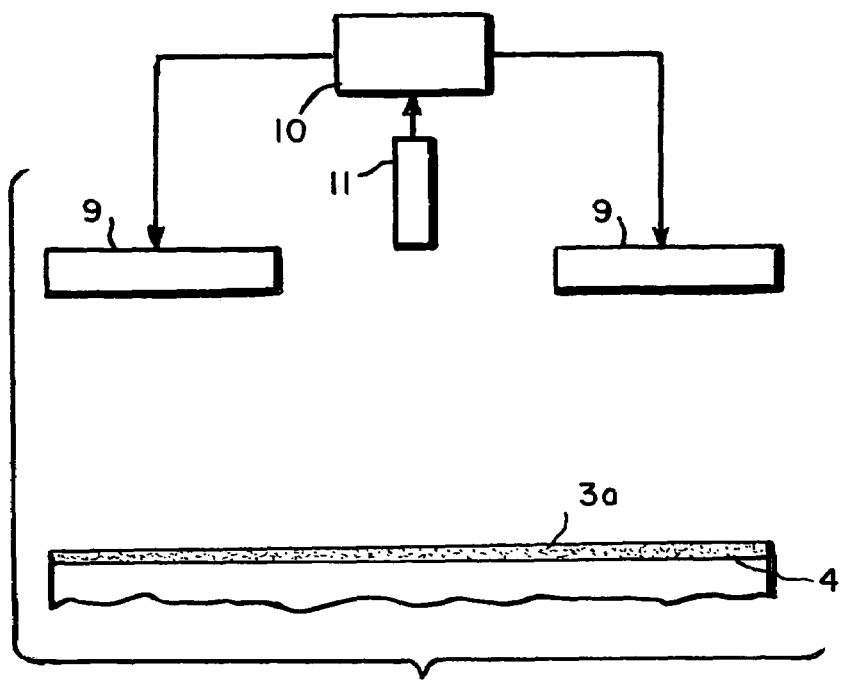
FIG. 2 shows a schematic representation of a detail of the device of FIG. 1.

FIG. 2 shows a detail of the device of FIG. 1. Radiant heaters 9 are arranged at a distance above the working plane 4 in which the powder layer 3a applied last is situated. Furthermore, a pyrometer 11 is arranged above the working plane 4 and a signal output of the pyrometer is connected to the heat control/regulation 10.

The heat control/regulation 10 and the output of the pyrometer as well as the drives for the height adjustment of the support and the drive for the coater as well as the control of the deflecting device and of the laser are in turn connected to a control and evaluating computer not shown.

Figure 3:
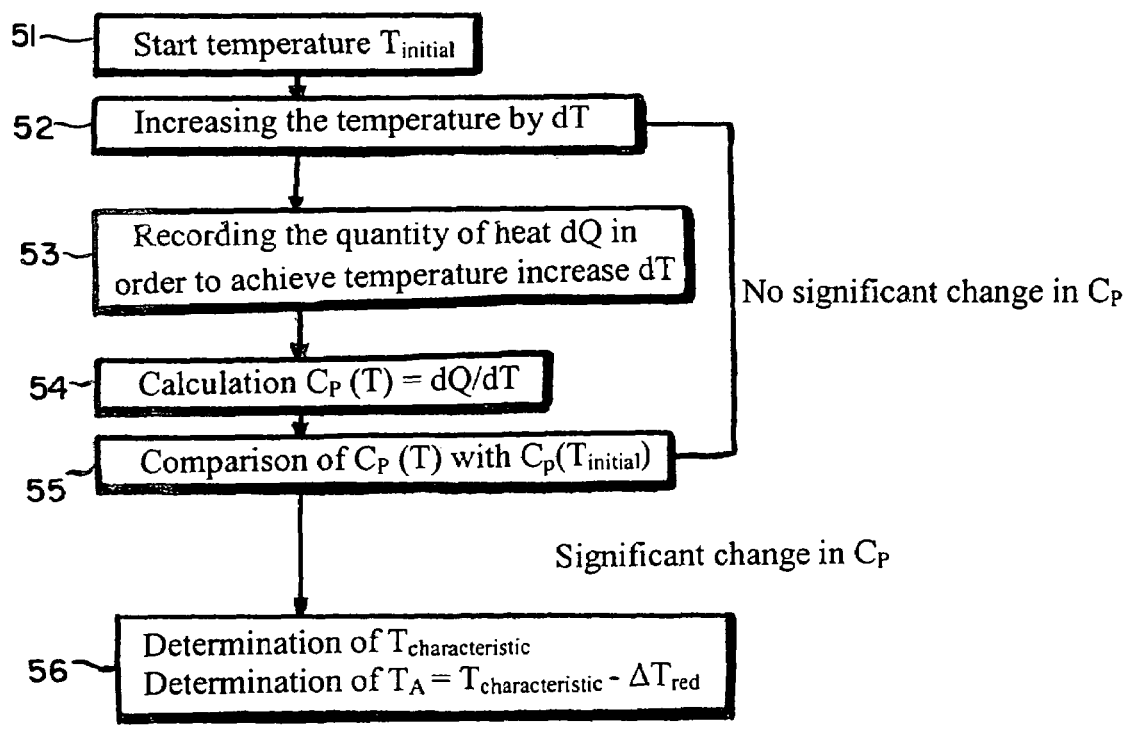
FIG. 3 shows a flow diagram of an exemplary embodiment of the process.

The process of the invention proceeds in the laser-sintering device according to the steps shown by way of example in FIG. 3. Before the building process, it is necessary to heat the laser-sintering device. A layer of pulverulent material, preferably a plastic material, such as for example polyamide or polystyrene, of predetermined thickness, which is greater than the thickness of the layers of the object, is thus applied to the support 2 in a first step (51). The thickness of this first layer is, for example about ten times the thickness of the object layers. The heating device is then controlled so that the first layer is brought to an initial temperature $T_{initial}$, which is recorded via the temperature-measuring device. The initial temperature $T_{initial}$ is selected so that it is considerably lower than the later working temperature $T_A$.

As soon as $T_{initial}$ is reached, in step 52 the temperature of the powder layer is increased by control of the heating capacity of the heating device by a preset increment dT, for example by 1° C. and the required time Δt is waited until the layer has assumed the new temperature $T=T_{initial}+dT$. The heating capacity introduced during this time via the heating device is known via the heat control. It is recorded and integrated to the heat energy introduced QdT, which is recorded in step 53. In step 54, the quantity of heat dQ is calculated therefrom, which is required for the temperature increase by dT. The specific thermal capacity $C_P$ of the material is thus ascertained as a function of the temperature T:

$C_P(T)=dQ/dT.$

The temperature is now increased incrementally by dT and in each case the quantity of heat dQ is recorded and $C_P(T)$ calculated. A temperature profile dQ/dT as a function of the set temperature T is produced from these calculated values.

In the process of the invention, furthermore in step 55 in each case the thermal capacity $C_P(T)$ ascertained at the current temperature T is compared with the thermal capacity at the temperature $T_{initial} C_P(T_{initial})$. If no significant change in $C_P$ takes place, the temperature is increased further by dT according to step 52 and continued with steps 53 to 55. If however a significant change in $C_P$ takes place, this means that the temperature is in the range of a transition point, that is for amorphous thermoplastics in the vicinity of the glass transition temperature or for partially crystalline thermoplastics in the vicinity of the melting peak. A significant change in $C_P$ is defined by a factor of change of $C_P(T)$ with respect to $C_P(T_{initial})$ determined for each material. After establishing the significant change of $C_P$, the temperature is not increased further in order not to solidify the powder. However, slight softening and partial sintering of the layer may be accepted in this process stage and does not influence the later construction process. This last measuring point has the temperature $T_{final}$. A temperature $T_{characteristic}$ characteristic for the phase transition of the material is determined from the ascertained temperature profile $C_P(T)$. The working temperature $T_A$ is then established in step 56 by subtracting a predetermined temperature amount $\Delta t_{red}$ from the characteristic temperature $T_{characteristic}$ and transferring to the heat regulation as command variable for the construction process. The characteristic temperature $T_{characteristic}$ is a characteristic parameter for characterizing the onsetting phase transition and may be, for example the onset temperature $T_{onset}$ for thermoplastic polymers or the melting temperature $T_{melt}$ for crystalline materials.

Determination of $T_{characteristic}$ preferably takes place via a software routine of machine control. The predetermined temperature amount $\Delta t_{red}$ can be established freely and is produced from empirical values for a specific sintering powder.

The preferred areas of application of the process of the invention lie in polymer sintering powders as materials. For the latter, the onset temperature $T_{onset}$ is generally determined as characteristic temperature and is defined as point of intersection of the inflectional tangent ta on the curve $C_P(T)$ at the point $dC_P/dT=0$ with the compensating lines in the measuring range $C_P$=constant.

Figure 4:
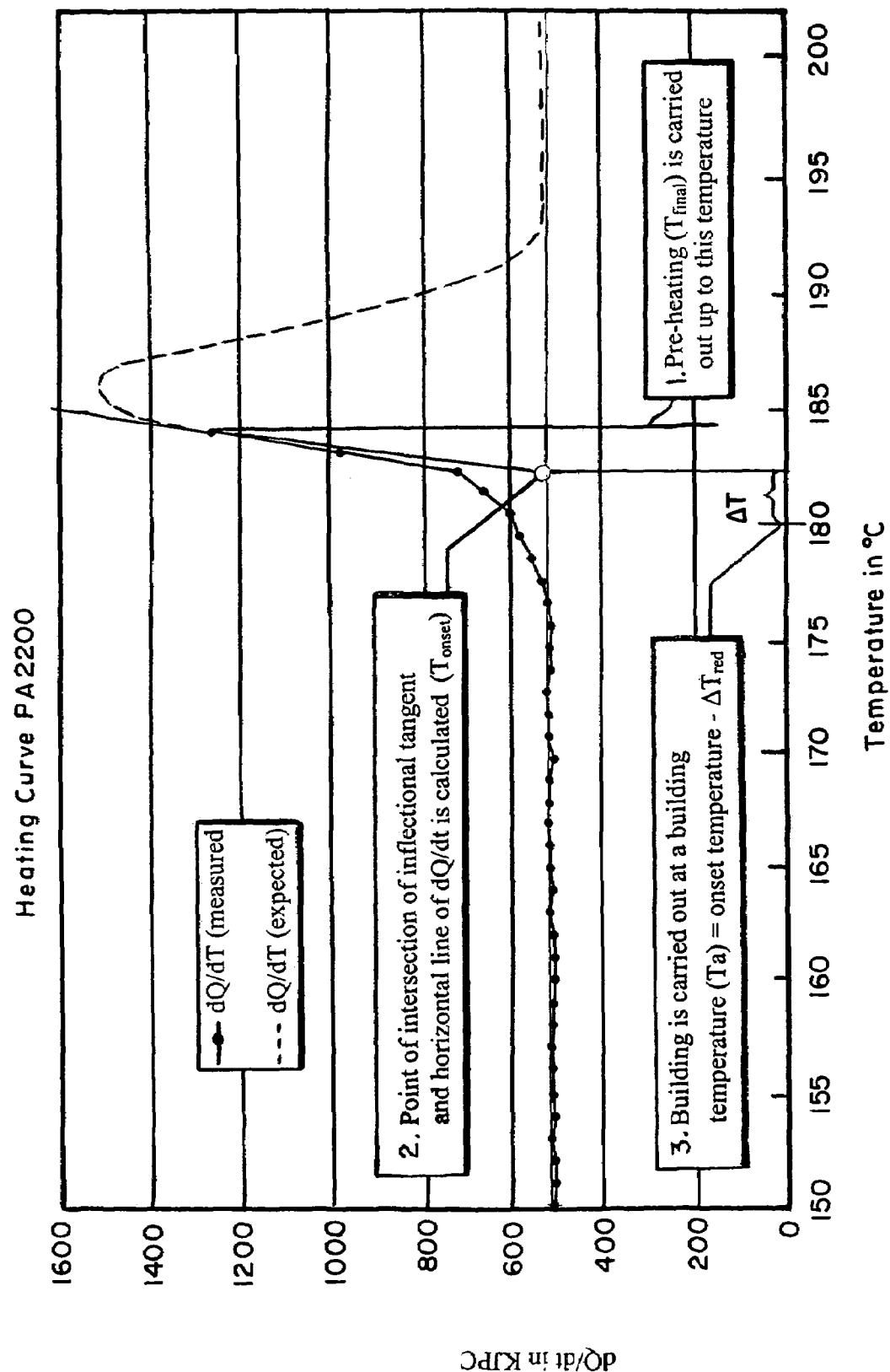
FIG. 4 shows an example of a temperature profile obtained by means of the process for a polyamide used as sintering powder.

FIG. 4 shows the heating curve or the temperature profile dQ/dT(T) for a polyamide (PA), a partially crystalline polymer, as sintering powder. For those polyamides used today for laser sintering, the working temperature $T_A$ is, for example depending on polyamide, on laser-sintering device, on powder charge, powder age and powder condition, between about 170° C. and about 185° C. The corresponding initial temperature is in this case about 140° C. Heating is carried out up to a temperature $T_{final}$, at which the factor $C_P(T_{final})$ to $C_P(T_{initial})$ lies between about 2 to about 3. The working temperature $T_A$ is selected so that it lies below the onset temperature $T_{onset}$ by about 1° C. to about 10° C.

Figure 5:
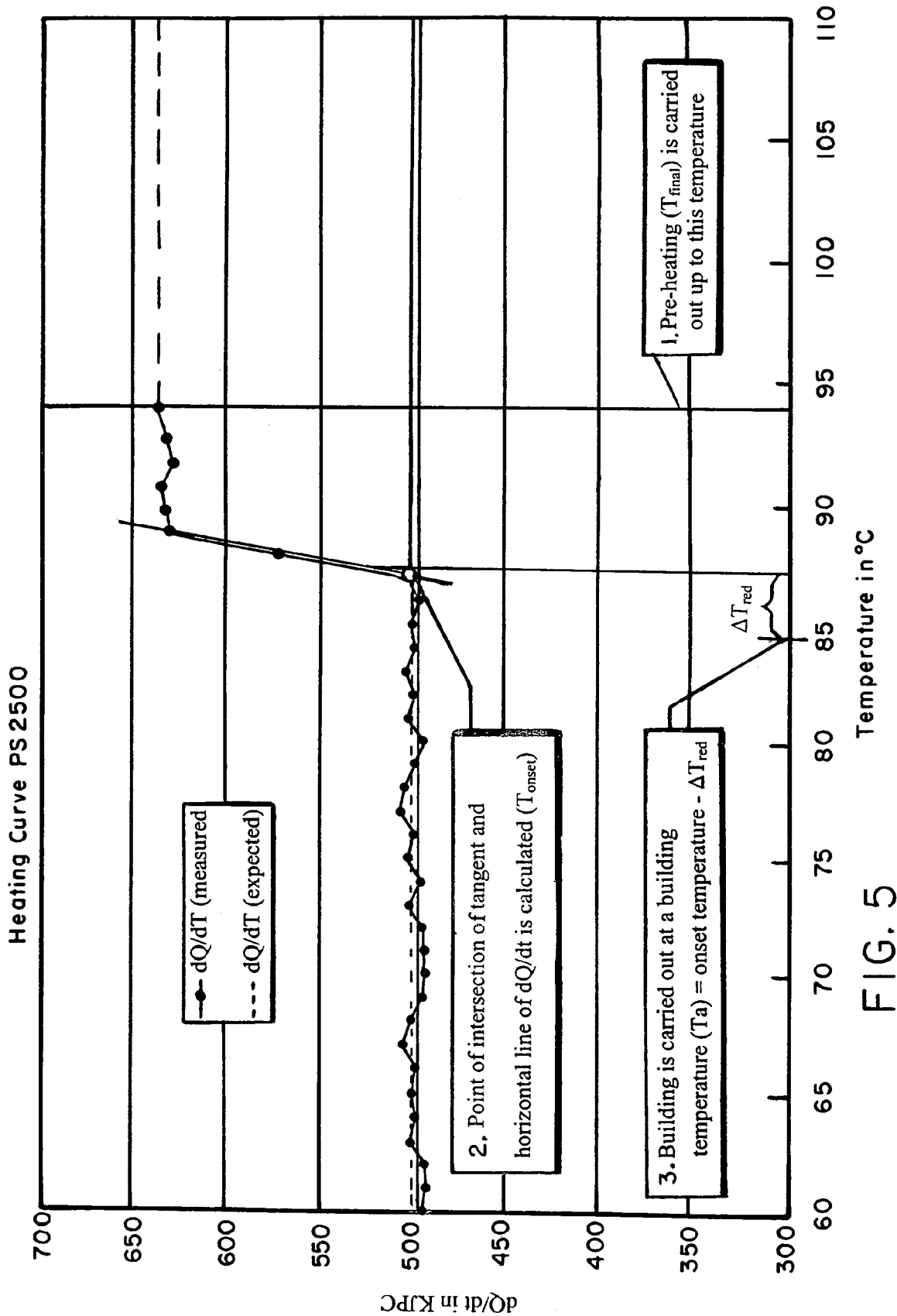
FIG. 5 shows an example of a temperature profile obtained by means of the process for a polystyrene used as sintering powder.

FIG. 5 shows the heating curve or the temperature profile dQ/dT(T) for a polystyrene (PS), an amorphous thermoplastic. The required working temperature $T_A$ is about 85° C. The corresponding initial temperature is in this case about 60° C. Heating is carried out up to a temperature $T_{final}$, at which the factor $C_P(T_{final})$ to $C_P(T_{initial})$ is about 2.2. The working temperature $T_A$ is adjusted to a temperature of about 1° C. to about 15° C. below the onset temperature $T_{onset}$.

The working temperature $T_A$ is thus determined both for a partially crystalline thermoplastic and for an amorphous thermoplastic as a function of a transition temperature actually ascertained via steps S1 to S6 and is thus adjusted in optimum manner to the powder used.

After determining the working temperature $T_A$, the conventional selective sintering process is carried out. A certain number of powder layers are typically applied before the first exposure with the laser takes place. After application, these layers again also require a certain heating capacity for a certain time. By measuring and integrating this capacity, the heat uptake of each newly applied layer is obtained. This may be placed in relation to a standard value or standard expectation value. If the heat uptake is higher than expected, more energy is necessary to heat the powder. One cause may be, for example moist powder. The laser power may be adapted to the result of this measurement. Furthermore, an imbalance during energy input between layers may also be established using this measurement, which layers have been applied by moving the coater 7 into the one or the other direction. This imbalance may be caused by different layer thicknesses, different powder densities, different moisture contents etc. In order to compensate these differences, the laser power may likewise be adapted to the powder currently being processed and the current adjustment of the machine.

The building process for the object takes place in known manner by application of a layer, pre-heating the layer to the working temperature $T_A$, exposure to the laser at the points corresponding to the object, lowering of the support 2 and application of the next layer, wherein these steps are repeated so often until the object is completed.

Establishing the temperature profile $C_P(T)$ must not necessarily take place before the construction process, but may take place even during the construction process, for example in order to carry out readjustment of the parameters.

The process and the device are not restricted to the design described. For example the laser power may be adapted to the result of the measurement $C_P(T)$.

The process is also not restricted to plastic powder, but may also be used for metal powders, ceramic powders etc. The temperature $T_{characteristic}$ should then be selected for the powder used, for example as melting temperature. However, it is preferably used for plastic powders.

The invention is also not restricted to a process and a device for laser sintering, but sintering by means of other radiation sources, for example sintering via an infrared radiation source may also be used, using a mask for producing the cross-sections of the object.

The invention claimed is:

1. A process for producing a three-dimensional object by layer-wise solidification of a pulverulent material by sintering of the material at points corresponding to the cross-section of the object by means of the action of radiation energy, the process comprising the steps of:

applying a layer of the pulverulent material to a substrate or a previously sintered layer;

pre-heating the pulverulent material to a working temperature ($T_A$) below the temperature at which the powder is sintered;

sintering of the material at the points corresponding to the cross-section of the object in the layer; and repeating the steps of applying a layer, pre-heating and sintering until the object is completed;

wherein, during said process for producing a three-dimensional object, the specific thermal capacity $C_P(T)$ of the pulverulent material is established on an applied powder layer before at least one sintering step by determining the quantity of heat taken up per temperature interval (dQ/dT) for at least two temperature intervals, and wherein the process includes controlled heating of an applied powder layer for determining the quantity of heat (Q) taken up by the powder per temperature interval for at least two temperature intervals.

2. The process according to claim 1, further comprising determining a material-specific temperature ($T_{characteristic}$) of the pulverulent material.

3. The process according to claim 2, wherein the material-specific temperature is a temperature selected from the group consisting of a melting temperature, a glass transition temperature and an onset temperature.

4. The process according to claim 2, further comprising adjusting the working temperature ($T_A$) so that it lies below an said determined material-specific temperature ($T_{characteristic}$) by a preset temperature interval ($\Delta T_{red}$).

5. The process according to claim 1, further comprising determining the power of the radiation source required for sintering as a function of the quantity of heat taken up per temperature interval.

6. The process according to claim 1, further comprising controlling or regulating the heating power of a heating device used for pre-heating as a function of the quantity of heat taken up per temperature interval.

7. The process according to claim 1, further comprising the step of determining the quantity of heat taken up by the powder per temperature interval is carried out during the producing of the object.

8. The process according to claim 1, further comprising providing a laser as a radiation source.

9. The process according to claim 1, further comprising providing a plastic powder for the pulverulent material.

10. The process according to claim 9, wherein the plastic material comprises a polyamide or a polystyrene.

11. The process according to claim 1, further comprising determining a material-specific temperature ($T_{characteristic}$) of the pulverulent material from a change of the quantity of heat taken up per temperature interval.

12. The process according to claim 1, further comprising adjusting the working temperature ($T_A$), to which the powder is to be pre-heated, as a function of the change ascertained.

* * * * *